(12) United States Patent
Jung

(10) Patent No.: US 11,856,120 B2
(45) Date of Patent: Dec. 26, 2023

(54) MOBILE TERMINAL

(71) Applicant: LG ELECTRONICS INC., Seoul (KR)

(72) Inventor: Yunsuk Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 17/417,355

(22) PCT Filed: Jan. 11, 2019

(86) PCT No.: PCT/KR2019/000487
§ 371 (c)(1),
(2) Date: Jun. 22, 2021

(87) PCT Pub. No.: WO2020/145444
PCT Pub. Date: Jul. 16, 2020

(65) Prior Publication Data
US 2022/0078268 A1    Mar. 10, 2022

(51) Int. Cl.
*H04M 1/02*    (2006.01)

(52) U.S. Cl.
CPC ....... *H04M 1/0264* (2013.01); *H04M 1/0272* (2013.01); *H04M 2201/38* (2013.01)

(58) Field of Classification Search
CPC ............. H04M 1/0264; H04M 1/0272; H04M 2201/38
USPC ..................................................... 455/556.1
See application file for complete search history.

(56) References Cited

U.S. PATENT DOCUMENTS

| | | | |
|---|---|---|---|
| 7,891,826 B2* | 2/2011 | Fujinawa | H04N 9/315 353/94 |
| 8,023,996 B2* | 9/2011 | Camp, Jr. | H04N 9/3173 345/589 |
| 8,666,446 B2* | 3/2014 | Kim | H04N 9/3194 455/566 |
| 8,690,336 B2* | 4/2014 | Yoshikawa | G03B 21/005 353/100 |
| 8,696,142 B2* | 4/2014 | Osaka | G03B 21/145 353/121 |

(Continued)

FOREIGN PATENT DOCUMENTS

| | | |
|---|---|---|
| CN | 108683757 | 10/2018 |
| KR | 101462351 | 11/2014 |

(Continued)

OTHER PUBLICATIONS

PCT International Application No. PCT/KR2019/000487, International Search Report dated Oct. 11, 2019, 8 pages.

*Primary Examiner* — April G Gonzales
(74) *Attorney, Agent, or Firm* — LEE, HONG, DEGERMAN, KANG & WAIMEY PC

(57) ABSTRACT

A mobile terminal comprises: a case; a display unit disposed on the front surface of the case and including a hole; a camera mounted in the case; an image output unit disposed at one side of the camera; a switching device for selectively placing the image output unit and the camera inward from the hole; and a control unit for controlling the camera, the image output unit, and the switching device. The mobile terminal outputs an image even to the hole of the display unit when the camera is not used through the hole, and thus can substantially implement full vision.

9 Claims, 8 Drawing Sheets

(a)

(b)

(56) References Cited

U.S. PATENT DOCUMENTS

| | | | | |
|---|---|---|---|---|
| 8,833,948 B2* | 9/2014 | Osaka | ................ | H04N 9/3155 |
| | | | | 353/97 |
| 8,857,997 B2* | 10/2014 | Horii | ................ | H04M 1/0237 |
| | | | | 353/57 |
| 8,896,578 B2* | 11/2014 | Kim | ................ | G06F 1/1639 |
| | | | | 345/175 |
| 9,509,924 B2* | 11/2016 | Terre | ................ | A62B 18/02 |
| 9,678,703 B2* | 6/2017 | Zhang | ................ | G06F 3/1431 |
| 10,425,516 B2* | 9/2019 | Zenebe | ................ | G03B 21/145 |
| 11,297,264 B2* | 4/2022 | Elmfors | ................ | G01J 5/025 |
| 2009/0036158 A1* | 2/2009 | Fujinawa | ................ | H04N 9/3185 |
| | | | | 455/556.1 |
| 2009/0066857 A1* | 3/2009 | Camp, Jr. | ................ | H04N 9/3182 |
| | | | | 348/744 |
| 2010/0099456 A1* | 4/2010 | Kim | ................ | G06F 3/0346 |
| | | | | 455/556.1 |
| 2010/0099458 A1* | 4/2010 | Shin | ................ | H04M 1/0272 |
| | | | | 348/744 |
| 2011/0102599 A1* | 5/2011 | Kwon | ................ | G06F 3/0304 |
| | | | | 348/164 |
| 2011/0134300 A1* | 6/2011 | Chung | ................ | H04M 1/0254 |
| | | | | 345/173 |
| 2015/0077830 A1* | 3/2015 | Lin | ................ | G06F 1/1613 |
| | | | | 359/275 |
| 2022/0303443 A1* | 9/2022 | Wei | ................ | G03B 15/03 |

FOREIGN PATENT DOCUMENTS

| | | |
|---|---|---|
| KR | 101505229 | 3/2015 |
| KR | 1020180008238 | 1/2018 |

\* cited by examiner (a)

(b)

(a)

(b)

(a)

(b)

MOBILE TERMINAL

CROSS-REFERENCE TO RELATED APPLICATIONS

This application is the National Stage filing under 35 U.S.C. 371 of International Application No. PCT/KR2019/000487, filed on Jan. 11, 2019, the contents of which are all incorporated by reference herein in its entirety.

TECHNICAL FIELD

The present disclosure relates to a mobile terminal in which a camera and an image output device are selectively placed in a hole of a display to realize full vision.

BACKGROUND ART

A display region of a general display is implemented as a plurality of gate lines and a plurality of data lines vertically intersect each other.

However, following a recent trend toward maximizing the display region, attempts to implement display regions of various shapes are continuing. This includes a case in which electronic components such as a camera hole, a receiver, and the like are disposed in the display region. Such electronic components include openings such as a notch in a notch display, a hole in a hole display, or the like.

Although a design (full vision) in which a display unit covers most of a front surface by enlarging an area occupied by the display unit on the front surface was implemented, there is a limitation in that true full vision is not able to be realized because there is a problem that the opening is located in an image. In addition, when important information is located in the opening, it is difficult to utilize a mobile terminal.

DISCLOSURE

Technical Problem

The present disclosure aims to realize full vision of a mobile terminal by selectively placing a camera and an image output device in a hole of a display.

Technical Solutions

Provided is a mobile terminal including a case, a display unit located on a front surface of the case, wherein the display unit includes a hole defined therein, a camera mounted on the case, an image output device disposed in a region on one side of the camera, a switching apparatus for selectively disposing the image output device and the camera inwardly of the hole, and a controller that controls the camera, the image output device, and the switching apparatus.

The image output device may include a projector for outputting an image, the mobile terminal may further include a polymer dispersed liquid crystal (PDLC) disposed in the hole and whose transparency changes depending on whether power is applied, and the controller may control the projector to make the polymer dispersed liquid crystal opaque and output the image on the polymer dispersed liquid crystal when being located in the hole.

The image output device may include a display panel for outputting an image, and the controller may control the display panel to output the image through the hole.

The controller may control the display panel such that the image enlarged to be larger than an image output on the display unit is output on the display panel.

The mobile terminal may further include a compensation lens disposed on a front surface of the display panel, wherein the compensation lens magnifies the image output on the display panel.

The switching apparatus may include a rotating plate having the image output device and the camera mounted thereon, and a driver for rotating the rotating plate.

The switching apparatus may include a slide panel having the image output device and the camera mounted thereon, and a driver for moving the slide panel in a linear direction.

The switching apparatus may include a driver for disposing the image output device at a location between the camera and the hole.

The controller may control the switching apparatus such that the camera is located in the hole when an application using the camera is executed.

Advantageous Effects

According to at least one of the embodiments of the present disclosure, substantive full vision may be realized by outputting the image through the hole of the display unit when not using the camera or the like.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
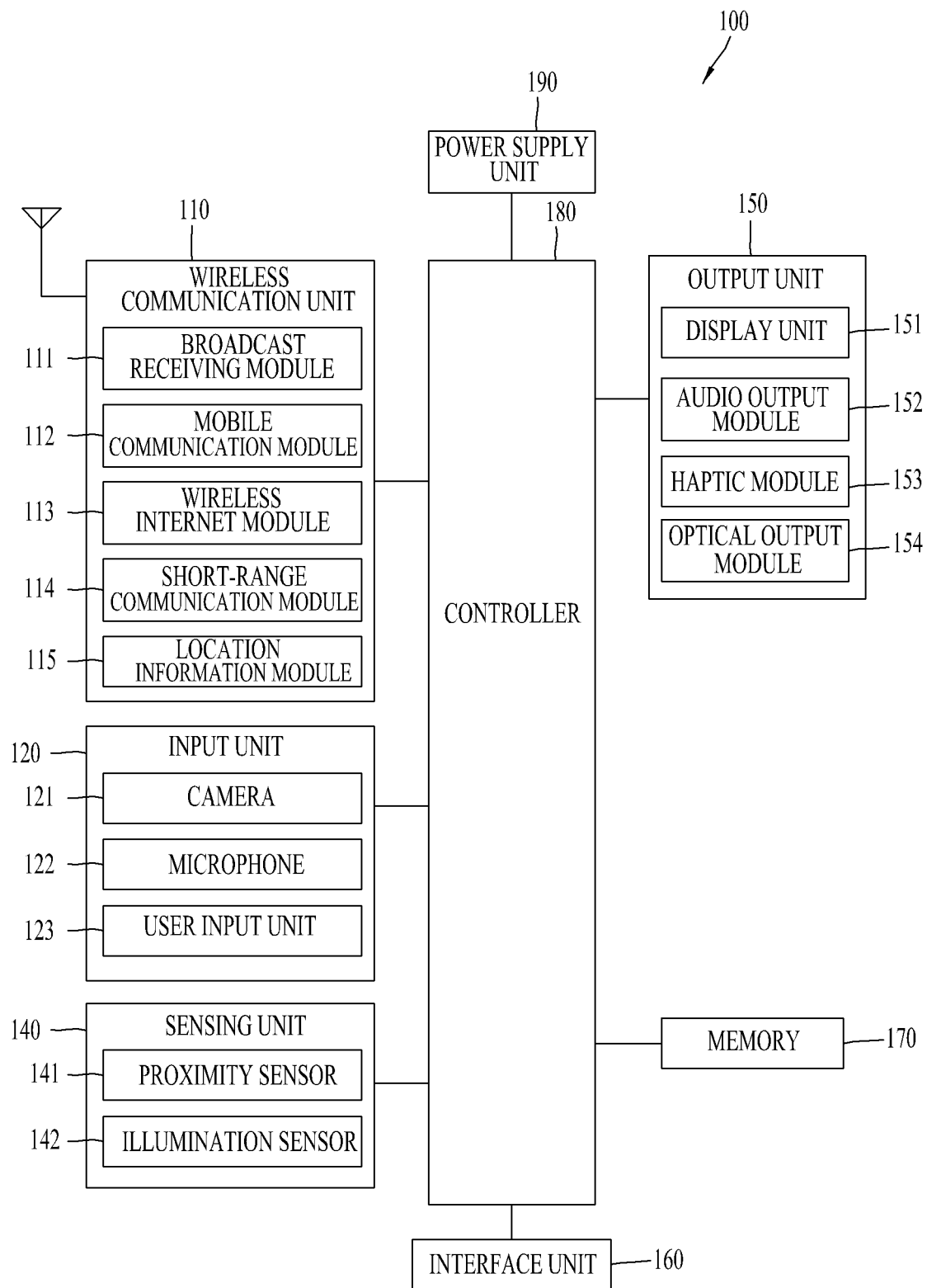
FIG. 1A is a block diagram of a mobile terminal in accordance with the present disclosure.
Figure 1B:
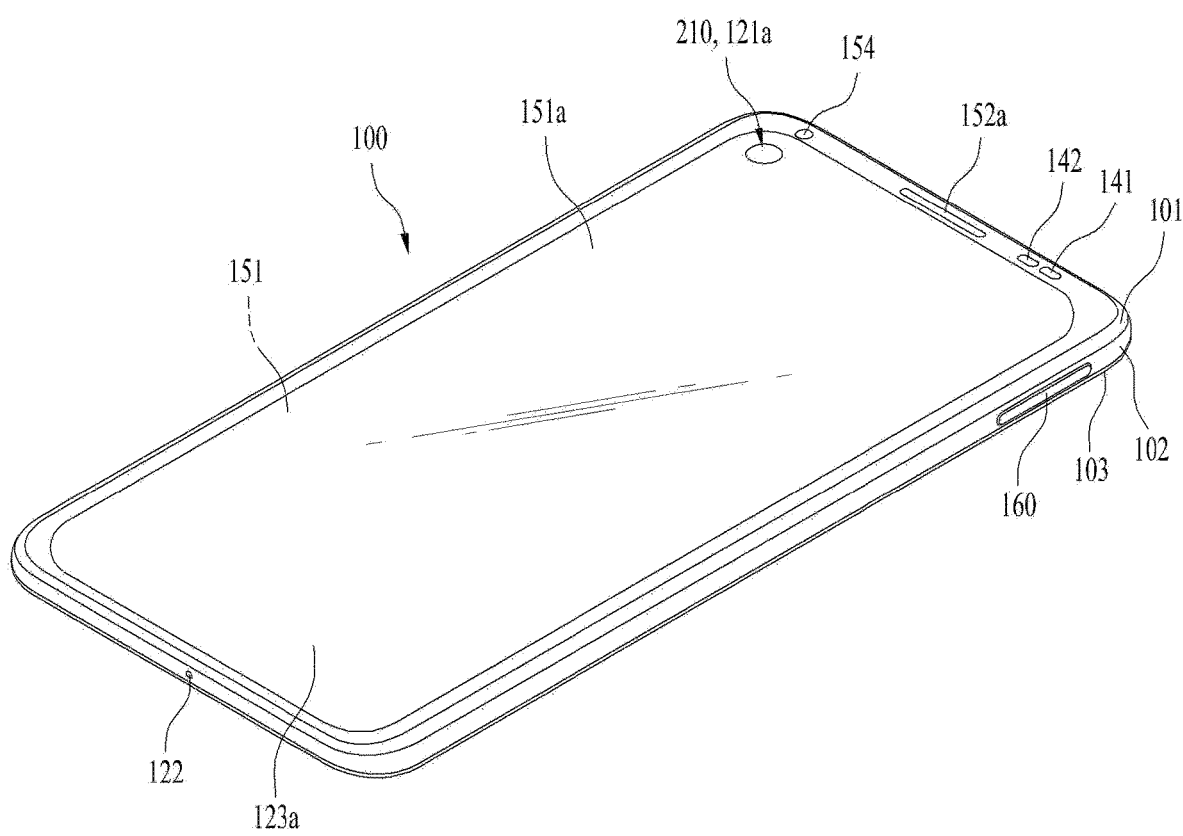
FIGS. 1B and 1C are conceptual views of one example of the mobile terminal, viewed from different directions.
Figure 1C:
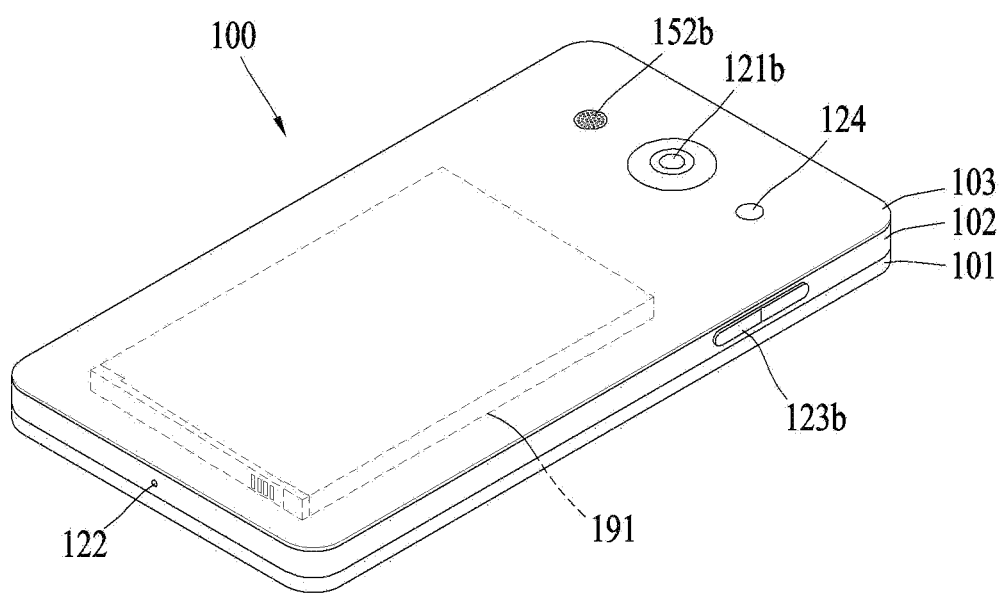

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The display unit 151, the front surface camera 121a, the proximity sensor 141, the receiver 152a, the optical output module 154, and the like are disposed on a front surface of the mobile terminal 100. Conventionally, the front surface camera 121a, the proximity sensor 141, the receiver 152a, the optical output module 154, and the like are disposed around the display unit 151.

Figure 2:
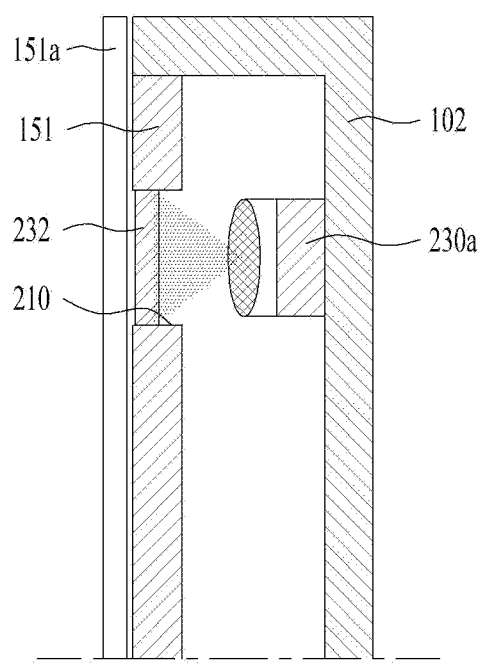
FIG. 2 is a diagram showing an embodiment of an image output device for outputting an image through a hole of the present disclosure.
Figure 2:
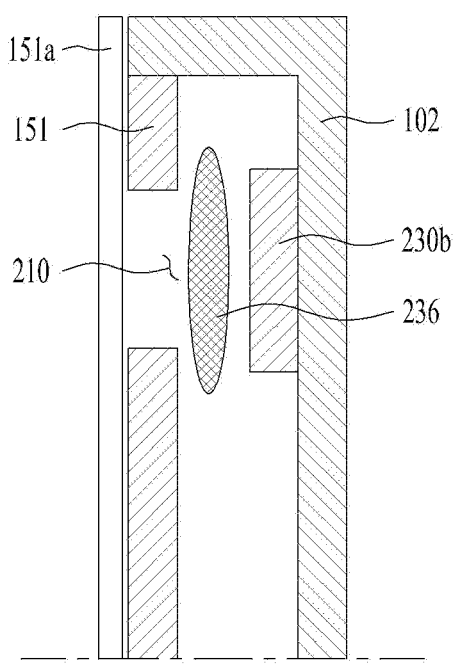

However, in the recent mobile terminal 100, in order to minimize a region around the display unit and maximize the display unit 151, a form in which a hole 210 is defined by omitting a portion of the display unit 151 like a hole in the display unit 151 as shown in FIG. 2, or a notch is defined in the display unit 151 and front surface mounting parts are placed in the notch is emerging.

In addition to the hole 210 for the front surface parts such as the actual camera 121a and the like, a sealing structure 212 for covering a layered structure of a display panel exposed through a side surface of the hole 210 is required.

As shown in FIG. 1B, the proximity sensor 141, the receiver 152a, the optical output module 154, and the like may be omitted from the front surface, may be removed from the front surface using a method for disposing the same at different locations, or may be mounted at an upper portion even when a size of the display unit 151 is increased because of a small area occupied on the front surface.

However, it is difficult to omit the front surface camera 121a as it is necessarily an essential component in a situation where self-camera filming is common. In addition, because the camera 121a has a larger size compared to other front surface components, it is difficult to dispose the camera 121a at an upper end portion of the extended display unit 151. Therefore, in order to extend the display unit 151 while disposing the camera 121a on the front surface, the camera 121a should be placed in the hole 210 of the display unit 151. Hereinafter, the camera will be described as a reference, but the proximity sensor, the optical output module, and the like may be disposed in the hole 210 as well as the camera 121a.

Although the hole 210 is defined to maximize the size of the display unit 151, it becomes a problem when unity of the image output on the display unit 151 is impaired, an important image or character contained in the image output on the display unit 151 is overlapped in the hole 210, or a desired image is not output.

The present disclosure includes an image output device 230 that outputs the image at a location corresponding to the hole 210 when the camera 121a is not used to solve the above problem. FIG. 2 is a diagram showing an embodiment of the image output device 230 for outputting the image through the hole 210 of the present disclosure.

FIG. 2A is a diagram showing a projector 230a as the image output device 230, and the projector 230a outputs the image toward the hole 210. A polymer dispersed liquid crystal 232 positioned in the hole 210 may be disposed such that the image shot from the projector 230a is formed in the hole 210. The polymer dispersed liquid crystal (PDLC) becomes transparent as the liquid crystals are aligned when power is applied, and scatters light and decreases in transparency as the liquid crystal arrangement becomes irregular when the power is not applied. When the liquid crystal arrangement in the polymer dispersed liquid crystal 232 becomes irregular, the image output from the projector 230a is formed. In addition, when the polymer dispersed liquid crystal 232 becomes transparent, an external image may be filmed using the camera 121a through the hole 210.

FIG. 2B includes a display panel 230b as the image output device 230. As the display panel 230b, a liquid crystal display (LCD), a thin film transistor-liquid crystal display (TFT LCD), an organic light-emitting diode (OLED), and the like may be used like the display panel.

The image output device 230 may output image information of the location corresponding to the hole 210 of image information output on the display unit 151. In the case of FIG. 2B, because light emitted from the projector 230a is focused on the polymer dispersed liquid crystal located in the hole, there is no difference in size between the image output on the display unit 151 and the image focused on the polymer dispersed liquid crystal 232.

However, in the case of the display panel 230b spaced apart from the display unit 151 as shown in FIG. 2B, when outputting the image information of the same size as that at the portion corresponding to the hole 210 of the images output from the display unit 151, a sense of heterogeneity may occur because of perspective. In order to resolve such sense of heterogeneity, as shown in FIG. 2B, by placing a compensation lens 236 on a front surface of the display panel 230b to enlarge the image, it is possible to reduce an image size difference resulted from perspective.

Alternatively, a larger image may be output on the display panel 230b in consideration of a difference in location from the display unit 151. In this case, a size of the display panel 230b may be larger than a size of the hole 210.

Figure 3:
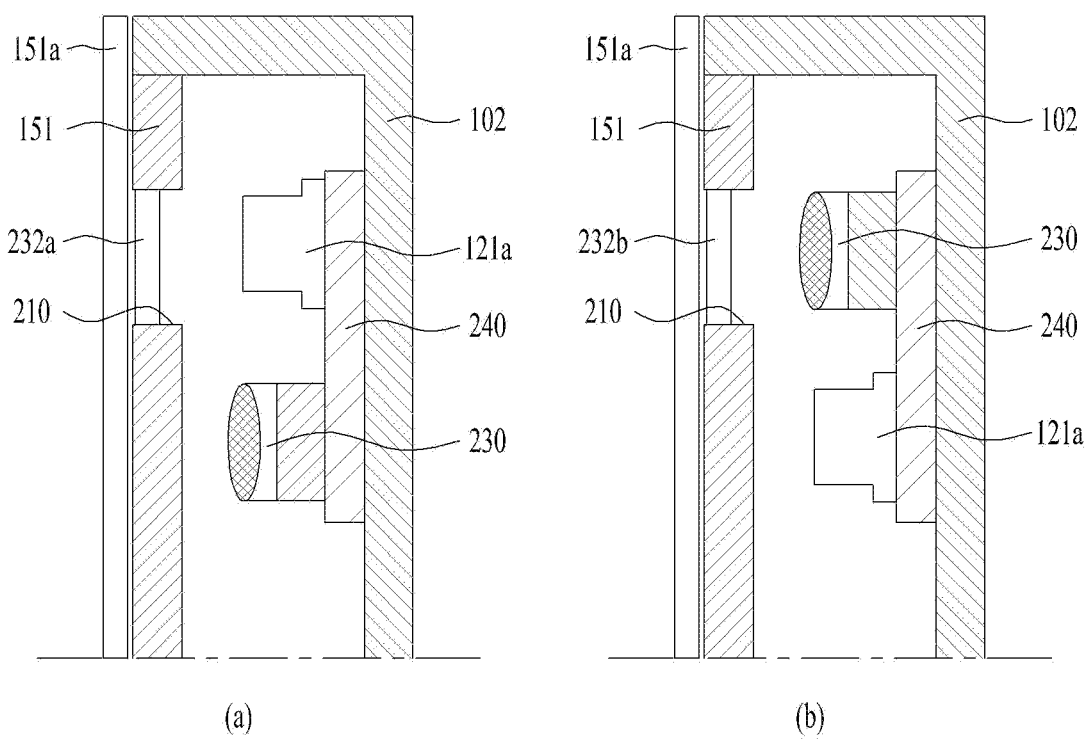
FIG. 3 is a diagram for illustrating an operation of a switching apparatus for selectively disposing an image output device and a camera in a hole of the present disclosure.

FIG. 3 is a diagram for illustrating an operation of a switching apparatus 240 for selectively disposing the image output device 230 and the camera 121a in the hole 210 of the present disclosure. In order to selectively disposed the image output device 230 and the camera 121*a*, the switching apparatus 240 is required.

When the camera 121*a* is located in the hole 210 as shown in FIG. 3A, because light must be introduced through the camera 121*a*, the power is applied to allow the polymer dispersed liquid crystal 232 to become transparent. When the image output device 230 is located in the hole 210 as shown in FIG. 3B, the liquid crystal arrangement of the polymer dispersed liquid crystal 232 becomes irregular, so that the image shot from the projector 230*a* may be formed on the polymer dispersed liquid crystal 232.

Figure 4:
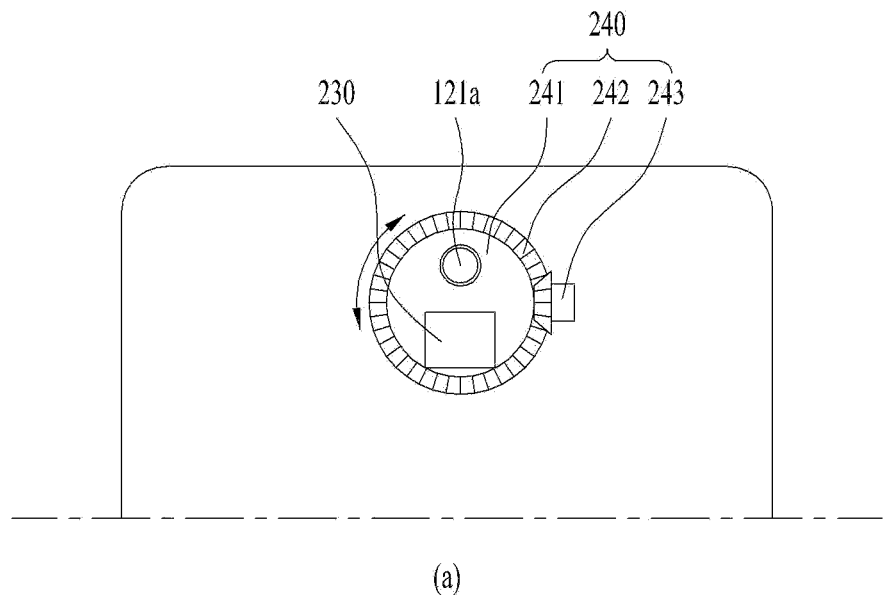
FIGS. 4 and 5 are diagrams showing embodiments of a switching apparatus for selectively disposing an image output device and a camera in a hole of the present disclosure.
Figure 4:
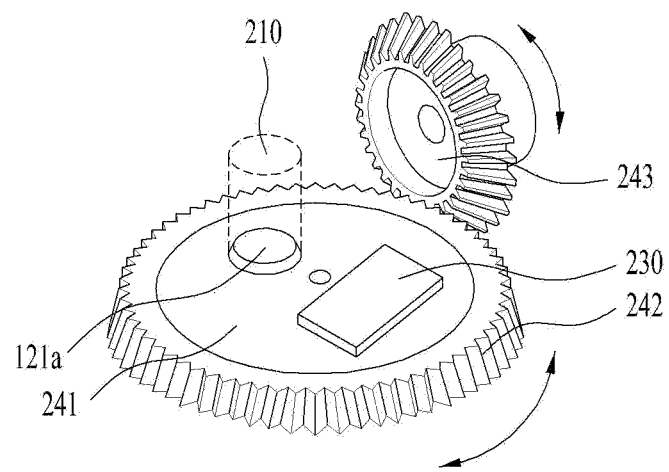

FIG. 4 is a diagram showing an embodiment of the switching apparatus 240 for selectively disposing the image output device 230 and the camera 121*a* in the hole 210 of the present disclosure. The switching apparatus 240 of the present embodiment includes a rotating plate 241 on which the image output device 230 and the camera 121*a* are mounted, and a driver 243 for rotating the rotating plate 241.

When using the camera 121*a*, the controller 180 controls the driver 243 to rotate the rotating plate 241 such that the hole 210 and the camera 121*a* are located on a straight line as shown in FIG. 3A. When not using the camera 121*a*, the controller controls the driver 243 to rotate the rotating plate 241 such that the image output device 230 and the hole 210 are located on a straight line as shown in FIG. 3B.

The driver 243 may include a motor that provides a rotational force and a gear that rotates in engagement with teeth formed along a circumference of the rotating plate 241 as shown in FIG. 4B. Because more space is required in a thickness direction of the mobile terminal 100 in order to directly connect the rotating plate 241 and the motor to each other, the motor may be disposed on a side surface of the rotating plate 241 and the rotating plate 241 may be rotated using the gear. A gear 242 formed on the rotating plate 241 and the gear connected to the driver may be implemented using a bevel gear having teeth formed on an inclined surface thereof. The bevel gear is able to transmit a rotational force having a direction perpendicular to a rotational shaft of the motor as an axis, thereby rotating the rotating plate 241 about the axis in the direction perpendicular to the rotational shaft of the motor.

Figure 5:
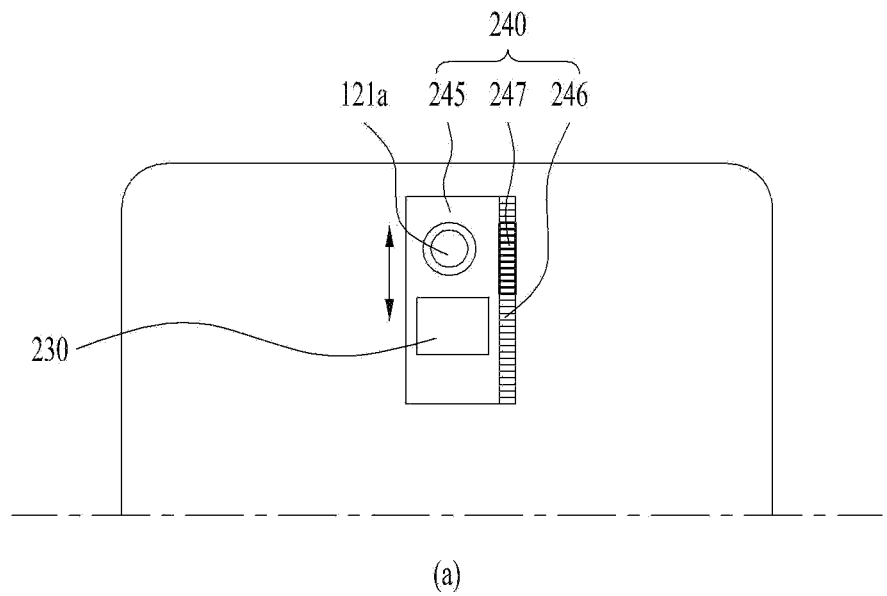
Figure 5:
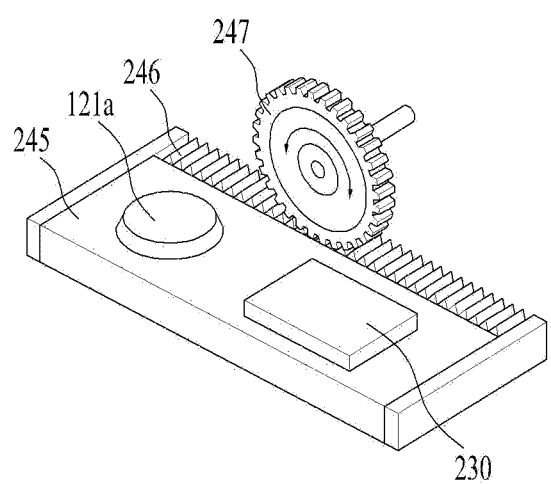

FIG. 5 is a diagram showing another embodiment of the switching apparatus 240 for selectively disposing the image output device 230 and the camera 121*a* in the hole 210 of the present disclosure. Instead of the rotating plate 241, locations of the camera 121*a* and the image output device 230 may be switched by moving a slide panel 245 in a left and right direction or in an up and down direction using the slide panel 245.

The slide panel 245 may use rack pinion gears to convert the rotation of the motor into a linear motion. A rack gear 246, which is teeth extending in a linear direction, is formed on the slide panel 245, and a pinion gear 247 is a disk-shaped gear that is engaged with the rack gear 246. In order to further reduce a thickness, the bevel gear including the inclined surface may be used as shown in FIG. 4B.

Figure 6:
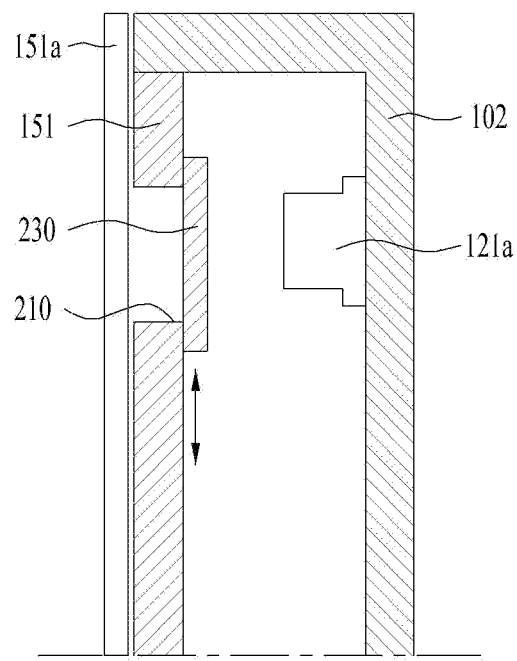
FIG. 6 is a diagram showing another embodiment of an image output device for outputting an image through a hole of the present disclosure.

FIG. 6 is a diagram showing another embodiment of the image output device 230 for outputting an image through the hole 210 of the present disclosure. When using the display panel as the image output device 230, because the thickness is small, as shown in FIG. 6, the image output device 230 may move to be located between the camera 121*a* and the hole 210 to output the image through the hole 210. In this case, the camera 121*a* may not move and only the image output device 230 may move.

According to at least one of the embodiments of the present disclosure as described above, when not using the camera 121*a* or the like, through the hole 210 of the display unit 151, the image may also be output through the hole 210 to realize substantive full vision.

It is obvious to those skilled in the art that the present disclosure may be embodied in other specific forms without departing from the spirit and essential characteristics of the present disclosure. The scope of the present disclosure should be determined by a reasonable interpretation of the appended claims, and any changes within the equivalent scope of the present disclosure are included in the scope of the present disclosure.

The invention claimed is:

1. A mobile terminal comprising:
   a housing;
   a display unit located on a front surface of the housing, wherein the display unit includes a hole defined therein;
   a camera mounted on the housing;
   an image output device disposed in a region on one side of the camera;
   a switching apparatus for selectively disposing the image output device and the camera inwardly of the hole; and
   a controller configured to control the camera, the image output device, and the switching apparatus.

2. The mobile terminal of claim 1, wherein the image output device includes a projector for outputting an image,
   wherein the mobile terminal further includes a polymer dispersed liquid crystal (PDLC) disposed in the hole and whose transparency changes depending on whether power is applied,
   wherein the controller is configured to control the projector to make the polymer dispersed liquid crystal opaque and output the image on the polymer dispersed liquid crystal when being located in the hole.

3. The mobile terminal of claim 1, wherein the image output device includes a display panel for outputting an image,
   wherein the controller is configured to control the display panel to output the image through the hole.

4. The mobile terminal of claim 3, wherein the controller is configured to control the display panel such that the image enlarged to be larger than an image output on the display unit is output on the display panel.

5. The mobile terminal of claim 3, further comprising a compensation lens disposed on a front surface of the display panel, wherein the compensation lens magnifies the image output on the display panel.

6. The mobile terminal of claim 1, wherein the switching apparatus includes a rotating plate having the image output device and the camera mounted thereon, and a driver for rotating the rotating plate.

7. The mobile terminal of claim 1, wherein the switching apparatus includes:
   a slide panel having the image output device and the camera mounted thereon; and
   a driver for moving the slide panel in a linear direction.

8. The mobile terminal of claim 1, wherein the switching apparatus includes a driver for disposing the image output device at a location between the camera and the hole.

9. The mobile terminal of claim 1, wherein the controller is configured to control the switching apparatus such that the camera is located in the hole when an application using the camera is executed.

* * * * *